United States Patent
Sato

(10) Patent No.: US 9,634,887 B2
(45) Date of Patent: Apr. 25, 2017

(54) SYSTEM, METHOD AND COMPUTER-READABLE MEDIUM FOR USING A PLURALITY OF VIRTUAL MACHINES

(71) Applicant: FUJITSU LIMITED, Kawasaki-shi, Kanagawa (JP)

(72) Inventor: Masahiro Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 14/266,986

(22) Filed: May 1, 2014

(65) Prior Publication Data
US 2014/0344424 A1  Nov. 20, 2014

(30) Foreign Application Priority Data

May 16, 2013 (JP) ................................ 2013-103968

(51) Int. Cl.
*H04L 12/24* (2006.01)
*G06F 9/455* (2006.01)
*G06F 9/48* (2006.01)

(52) U.S. Cl.
CPC ...... *H04L 41/0668* (2013.01); *G06F 9/45558* (2013.01); *G06F 9/4856* (2013.01); *G06F 2009/4557* (2013.01)

(58) Field of Classification Search
CPC ............... H04L 41/082; H04L 41/0668; G06F 9/45558; G06F 9/4856
USPC ........................................................ 709/221
See application file for complete search history.

(56) References Cited

U.S. PATENT DOCUMENTS

| | | | | |
|---|---|---|---|---|
| 8,601,133 B1* | 12/2013 | Rainovic | ............. | H04L 12/4633 709/227 |
| 8,874,749 B1* | 10/2014 | Vittal | ............. | G06F 9/5077 709/226 |
| 9,021,459 B1* | 4/2015 | Qu | ............. | G06F 8/65 710/33 |
| 9,100,274 B1* | 8/2015 | Ghosh | ............. | H04L 49/70 |
| 2009/0119538 A1* | 5/2009 | Scales | ............. | G06F 11/14 714/6.13 |
| 2009/0290591 A1* | 11/2009 | Zhang | ............. | H04L 45/00 370/401 |
| 2010/0106885 A1* | 4/2010 | Gao | ............. | G06F 9/45537 711/6 |
| 2011/0019676 A1* | 1/2011 | Portolani | ............. | H04L 45/00 370/395.53 |

(Continued)

FOREIGN PATENT DOCUMENTS

JP  2010-518710  5/2010

*Primary Examiner* — Nicholas Taylor
*Assistant Examiner* — Chong G Kim
(74) *Attorney, Agent, or Firm* — Oblon, McClelland, Maier & Neustadt, L.L.P.

(57) ABSTRACT

A system includes a first server configured to execute a first virtual machine among a plurality of virtual machines belonging to a first virtual network, the plurality of virtual machines identified by a common address in the first virtual network; and a second server; and a switch including a first port coupled to the first server and a second port coupled to the second server, and configured to: store an association between the common address and the first port; and update the association to associate the common address with the second port in place of the first port when the first virtual machine is migrated from the first server to the second server.

7 Claims, 24 Drawing Sheets

(56) References Cited

U.S. PATENT DOCUMENTS

| | | | |
|---|---|---|---|
| 2011/0202920 A1* | 8/2011 | Takase | G06F 9/45558 718/1 |
| 2011/0246669 A1* | 10/2011 | Kanada | G06F 9/4856 709/238 |
| 2012/0060010 A1* | 3/2012 | Shimozono | G06F 17/30067 711/165 |
| 2012/0185856 A1* | 7/2012 | Ashihara | G06F 9/4856 718/1 |
| 2012/0287936 A1* | 11/2012 | Biswas | H04L 49/70 370/395.3 |
| 2012/0291025 A1* | 11/2012 | Kidambi | H04L 49/70 718/1 |
| 2013/0055240 A1* | 2/2013 | Gondi | G06F 11/1484 718/1 |
| 2014/0003427 A1* | 1/2014 | Nishi | H04L 45/16 370/390 |

* cited by examiner

FIG. 7

| VIRTUAL MAC ADDRESS/ VIRTUAL IP ADDRESS | CONNECTION IF |
|---|---|
| B/1.1.1.2 | p10 |

FIG. 8

| DESTINATION ADDRESS | OUTPUT IF |
|---|---|
| B | P10 |
| b | P12 |

- ETHERNET HEADER
  DA : DESTINATION MAC ADDRESS
  SA : TRANSMISSION-SOURCE MAC ADDRESS
- IP HEADER
  DA : DESTINATION IP ADDRESS
  SA : TRANSMISSION-SOURCE IP ADDRESS

SYSTEM, METHOD AND COMPUTER-READABLE MEDIUM FOR USING A PLURALITY OF VIRTUAL MACHINES

CROSS-REFERENCE TO RELATED APPLICATION

This application is based upon and claims the benefit of priority of the prior Japanese Patent Application No. 2013-103968 filed on May 16, 2013, the entire contents of which are incorporated herein by reference.

FIELD

The embodiments discussed herein are related to a system, a method and a computer readable medium.

BACKGROUND

A virtual router redundancy protocol (VRRP) is a protocol for providing redundancy of nodes in networks. In a VRRP, one of a plurality of nodes belonging to a specific VRRP group is defined as a master node (that is, a current-in-use node) and the other nodes are defined as backup nodes (that is, standby nodes). Normally, only the master node performs processing. When a failure occurs in the master node, one of the backup nodes takes over the processing.

One virtual media access control (MAC) address and one virtual internet protocol (IP) address are assigned to each VRRP group. In a network using a VRRP, settings for switches and the like in the network are performed in such a manner that data whose destination addresses are the virtual MAC address and the virtual IP address is transferred to the master node.

A related art is described, for example, in Japanese National Publication of International Patent Application No. 2010-518710.

SUMMARY

According to an aspect of the invention, a system includes a first server configured to execute a first virtual machine among a plurality of virtual machines belonging to a first virtual network, the plurality of virtual machines identified by a common address in the first virtual network; a second server; and a switch including a first port coupled to the first server and a second port coupled to the second server, and configured to: store an association between the common address and the first port; and update the association to associate the common address with the second port in place of the first port when the first virtual machine is migrated from the first server to the second server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of data stored in a management table storage unit;

FIG. 8 is a diagram illustrating an example of data stored in an FDB;

DESCRIPTION OF EMBODIMENTS

First, discussions by an inventor will be explained. VRRPs may be applied to virtual machines as well as physical machines. Therefore, if a master node in a VRRP group is a virtual machine, the master node may be moved to a different server or the like by live migration.

Even if the master node is moved to a different server or the like, data whose destination is the VRRP group is transferred to the original server unless any action is taken with respect to the movement. However, since the master node does not exist in the original server, a communication failure occurs.

According to an embodiment described later, the occurrence of a communication failure may be suppressed in the case where a current-in-use virtual machine, amongst a plurality of virtual machines implementing a redundancy configuration, is moved.

Figure 1:
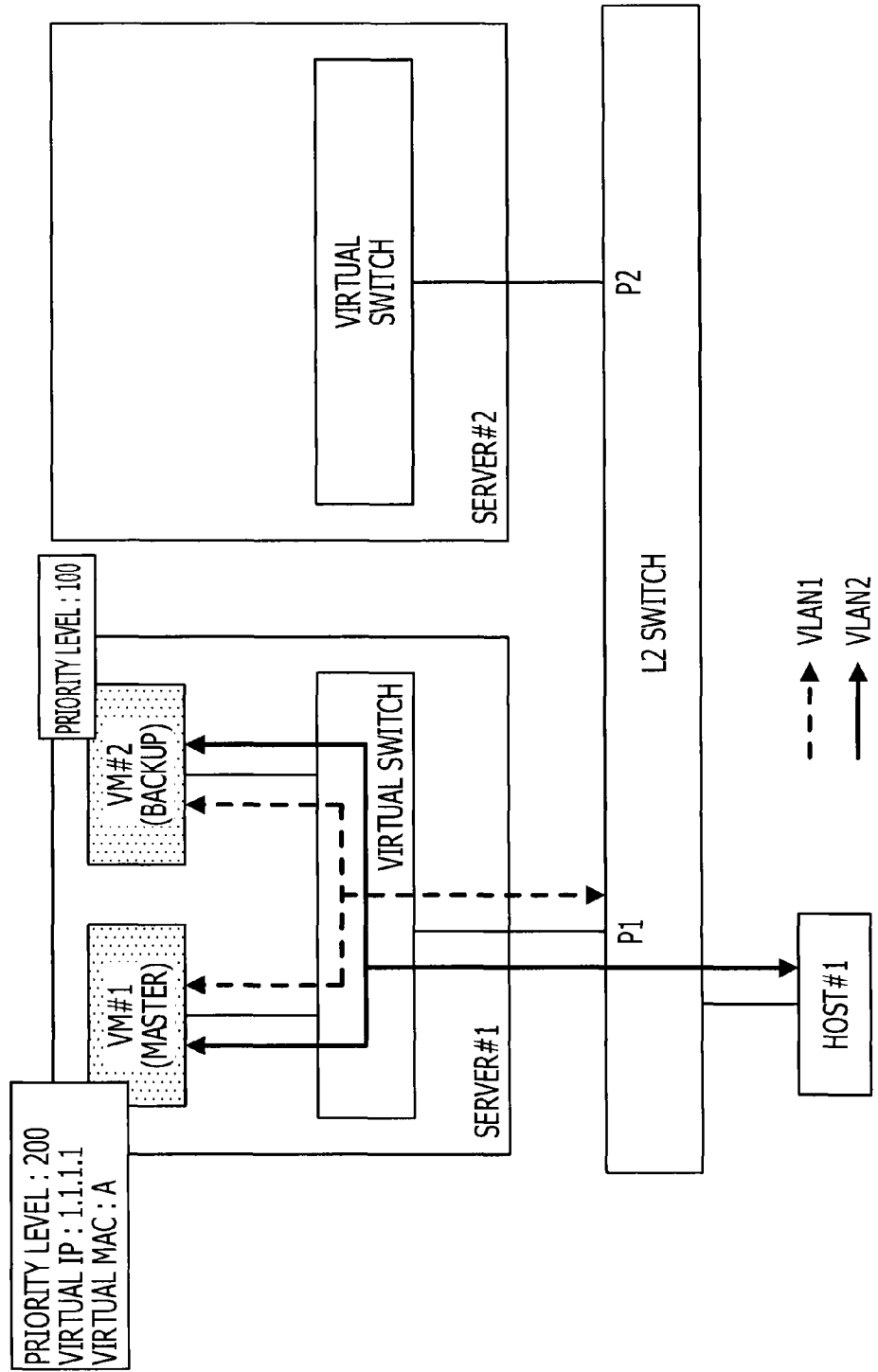
FIG. 1 is a diagram for explaining settings of a VRRP under a virtual environment.

Movement of a master node by live migration will be briefly explained below, with reference to FIGS. 1 to 3.

First, settings of a VRRP under a virtual circumstance will be explained below, with reference to FIG. 1. In the example of FIG. 1, a host #1, a server #1, and a server #2 are connected to a layer (L) 2 switch. In each of the server #1 and the server #2, a virtual switch is performed. In the server #1, a virtual machine (VM) #1 and a VM #2 are performed. The VM #1 and the VM #2 are connected to the virtual switch in the server #1. Here, the VM #1 and the VM #2 belong to the same virtual local area network (VLAN) (here, a VLAN 1), and the VM #1, the VM #2, and the host #1 belong to the same VLAN (here, a VLAN 2). The VLAN 1 is provided for transmitting and receiving a VRRP Advertisement message. The VLAN 2 is provided for transmitting and receiving data among the host #1, the VM #1, and the VM #2.

The VM #1 and the VM #2 belong to the same VRRP group. Since the VM #1 has a priority level higher than that of the VM #2, the VM #1 serves as a master node (that is, a current-in-use node) and the VM #2 serves as a backup node (that is, a standby node). The virtual MAC address and the virtual IP address of the VRRP group to which the VM #1 and the VM #2 belong, are "A" and "1.1.1.1", respectively. As described above, since one virtual MAC address and one virtual IP address are assigned to each VRRP group, the host #1 may not change a destination address even if the master node changes.

Live migration of the VM #1 will now be explained, with reference to FIG. 2. Referring to FIG. 2, by live migration, the VM #1 is moved to the server #2. When the VM #1 moves to the server #2, the virtual switch in the server #2 detects the movement, and transmits a gratuitous address resolution protocol (GARP) packet containing the MAC address "a" of the VM #1 to the L2 switch. The L2 switch receives the packet containing the transmission-source MAC address "a" through a port "P2", and updates data in a forwarding database (FDB). That is, in the FDB, the identifier of an output interface (IF) (here, a port) that is associated with the MAC address "a" is changed from "P1" to "P2". Note that live migration represents that a VM operating in a specific physical server or the like is moved to a different physical server or the like without stopping software such as an operation system (OS) or the like.

Figure 2:
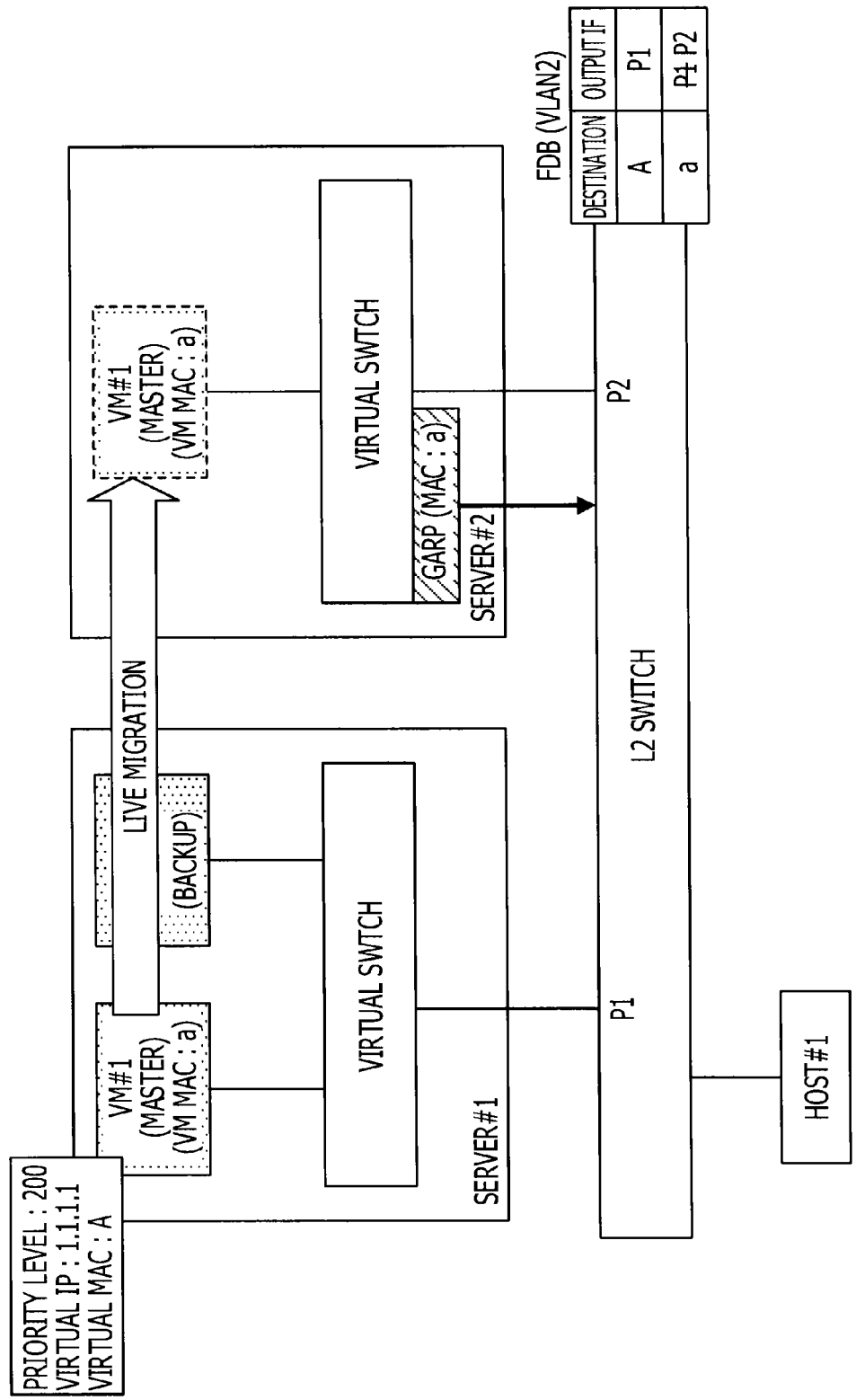
FIG. 2 is a diagram for explaining live migration of a VM.
Figure 3:
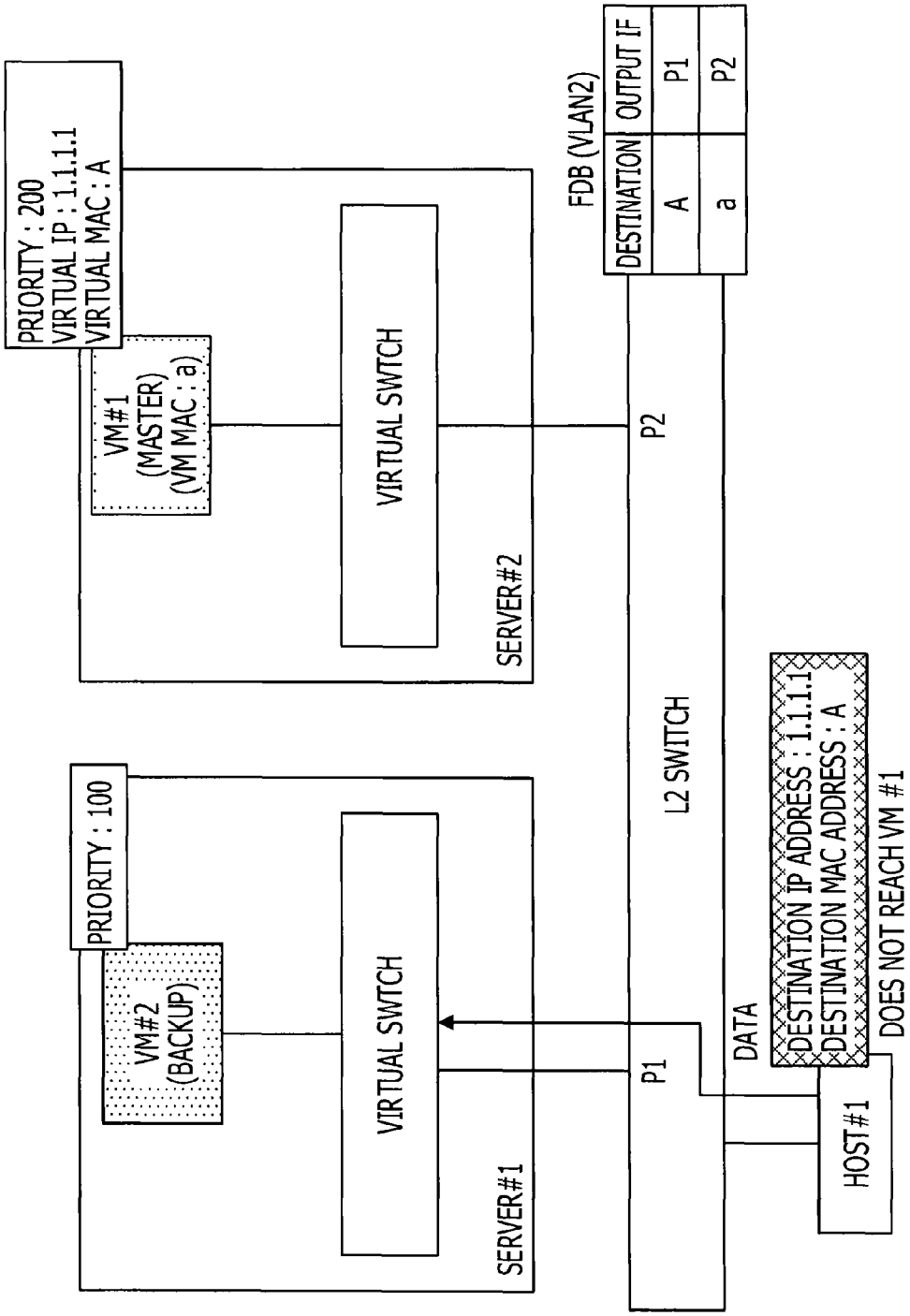
FIG. 3 is a diagram for explaining a problem caused by a virtual MAC address of a VRRP group not being updated.

The processing described with reference to FIG. 2 is processing that has been performed hitherto. With this processing, for the MAC address "a" of the VM #1, the output IF stored in the FDB may be updated. However, an output IF that is associated with a virtual MAC address "A" of the VRRP group to which the VM #1 and the VM #2 belong, is not updated.

A problem caused by the virtual MAC address of the VRRP group not being updated will be explained below, with reference to FIG. 3. Referring to FIG. 3, the host #1 transmits data whose destination addresses are the virtual MAC address "A" and the virtual IP address "1.1.1.1" of the VRRP group, to the L2 switch. Since data indicating that data whose destination is the virtual MAC address "A" is to be output to the output IF "P1" is stored in the FDB in the L2 switch, the data transmitted from the host #1 is transmitted to the server #1 via the port "P1". However, since the VM #1, which is the master node of the VRRP group, does not exist in the server #1, processing for the data is not performed.

A method for suppressing the occurrence of a communication failure, by rapidly performing settings of the layer 2 switch when the master node is moved by live migration, will be explained below.

Figure 4:
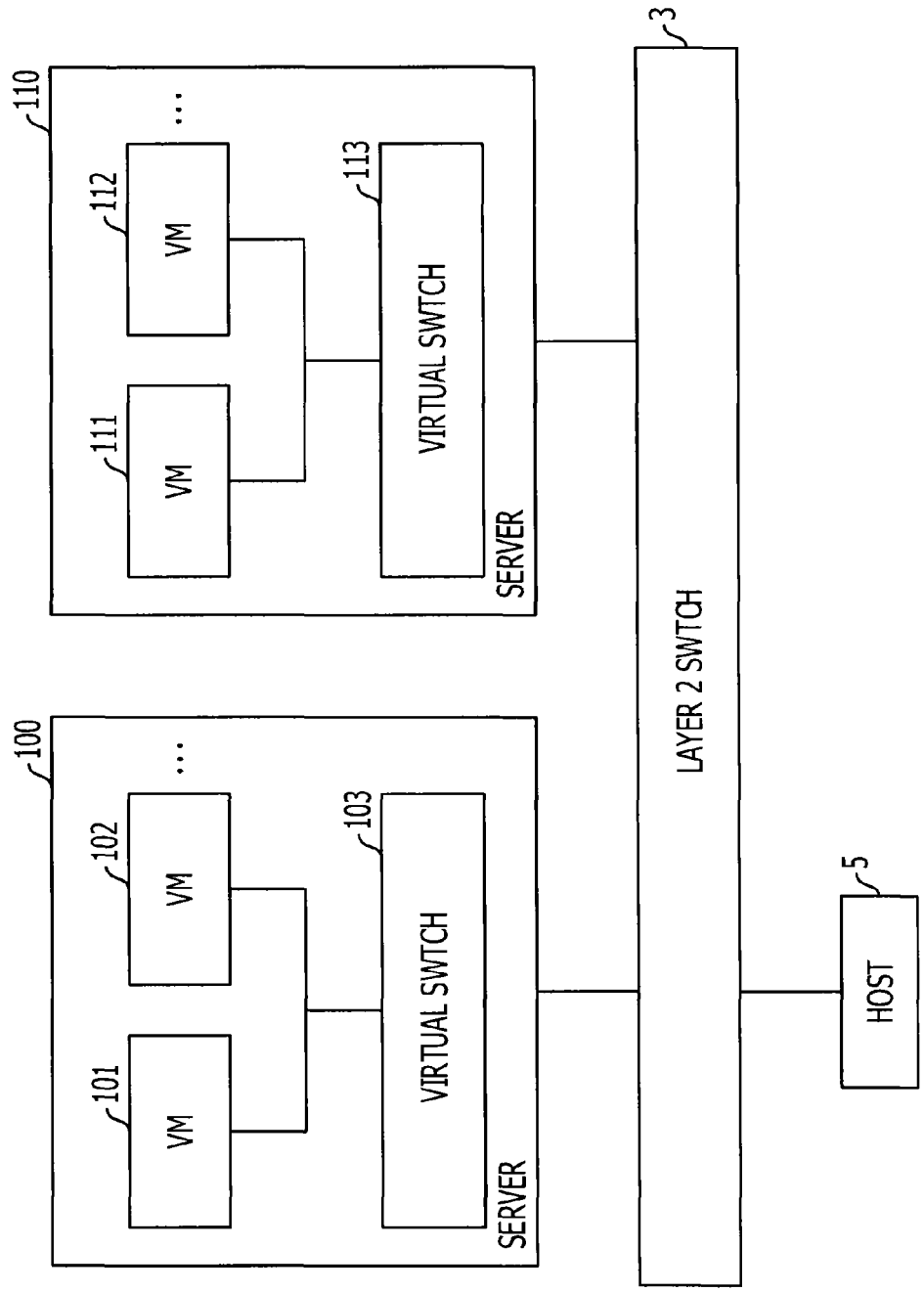
FIG. 4 is a diagram illustrating the overview of a system according to an embodiment.

FIG. 4 illustrates the overview of a system according to this embodiment. A server 100, which is a physical server, a server 110, which is a physical server, and a host 5 that communicates with a physical server, are connected to a layer 2 switch 3. In the server 100, a VM 101, a VM 102, and a virtual switch 103 are performed. The virtual switch 103 relays data within the server 100. In the server 110, a VM 111, a VM 112, and a virtual switch 113 are performed.

The virtual switch 113 relays data within the server 110. Although the number of VMs performing in each of the server 100 and the server 110 is two in FIG. 4, the number of the VMs is not limited to this.

Figure 5:
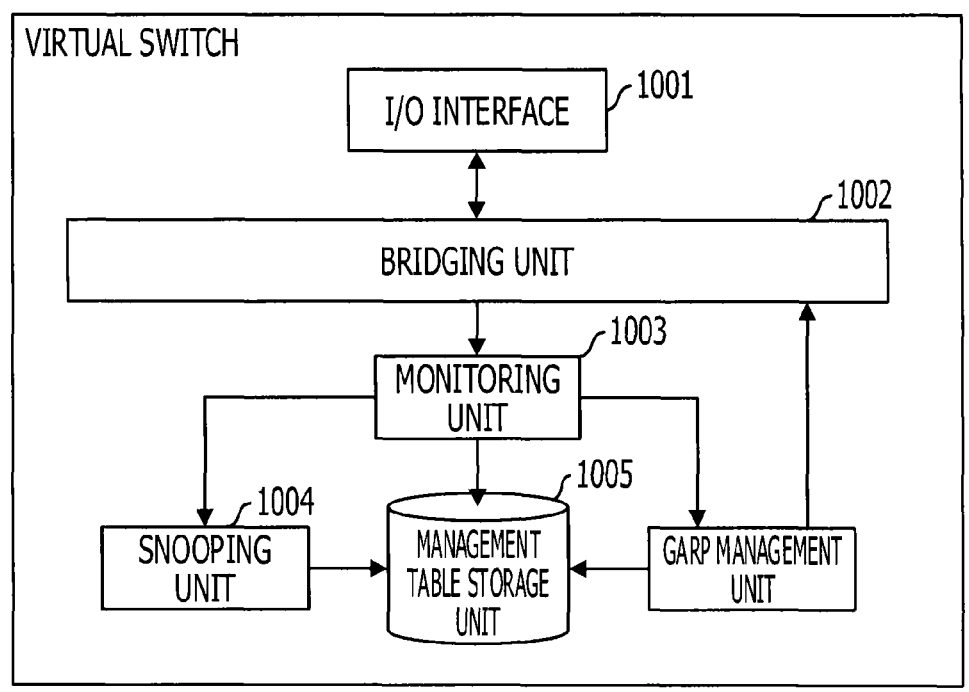
FIG. 5 is a functional block diagram of a virtual switch.

FIG. 5 is a functional block diagram of the virtual switches 103 and 113. In each of the virtual switches 103 and 113, an input/output (I/O) interface 1001, a bridging unit 1002, a monitoring unit 1003, a snooping unit 1004, and a GARP management unit 1006 are performed. Furthermore, for example, an area for a management table storage unit 1005 is provided in a storage device, such as a hard disk, in each of the servers 100 and 110.

The I/O interface 1001 is an interface (for example, a virtual port) for inputting and outputting data. The bridging unit 1002 relays data within a virtual switch. The monitoring unit 1003 detects that a VM serving as a master node has moved to the server in which the monitoring unit 1003 exists. Furthermore, the monitoring unit 1003 stores into the management table storage unit 1005 the identifier of a port that has received a VRRP Advertisement message. The snooping unit 1004 acquires a virtual MAC address and a virtual IP address from the VRRP Advertisement message, and stores the acquired virtual MAC address and virtual IP address into the management table storage unit 1005. The GARP management unit 1006 transmits a GARP packet containing the virtual MAC address and the virtual IP address of the VRRP group to the layer 2 switch 3, when a master node has moved to the server in which the GARP management unit 1006 exists.

Figure 6:
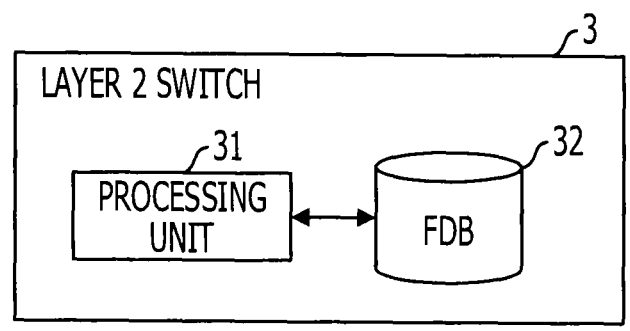
FIG. 6 is a functional block diagram of a layer 2 switch.

FIG. 6 is a functional block diagram of the layer 2 switch 3. The layer 2 switch 3 includes a processing unit 31 and an FDB 32. The processing unit 31 performs, for example, processing for managing data stored in the FDB 32.

FIG. 7 illustrates an example of data stored in the management table storage unit 1005 of each of the virtual switches 103 and 113. In the example of FIG. 7, the virtual MAC address, the virtual IP address, and the identifier of a connection IF (here, the identifier of a port) are stored in the management table storage unit 1005.

Figure 8:
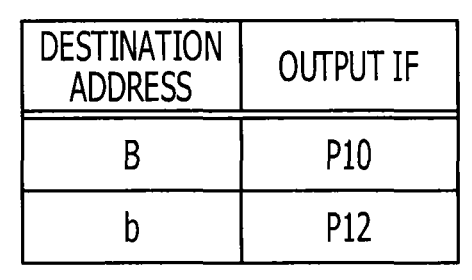

FIG. 8 illustrates an example of data stored in the FDB 32 of the layer 2 switch 3. In the example of FIG. 8, a destination address and the identifier of an output IF (here, the identifier of a port) are stored in the FDB 32. The data illustrated in FIG. 8 is prepared for each VLAN.

Figure 9:
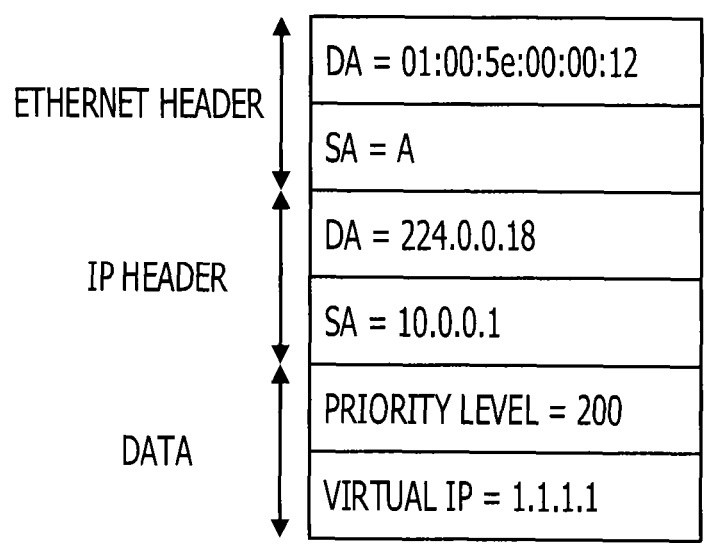
FIG. 9 is a diagram illustrating an example of a VRRP Advertisement message.

FIG. 9 illustrates an example of a VRRP Advertisement message in the VRRP. In the example of FIG. 9, the VRRP Advertisement message contains an Ethernet® header including a destination MAC address and a transmission-source MAC address, an IP header including a destination IP address and a transmission-source IP address, and data including priority level and a virtual IP address. As illustrated in FIG. 9, a dedicated multicast address (an IP address "224.0.0.18" and a MAC address "01:00:5e:00:00:12") is set for the destination. The transmission-source MAC address is a virtual MAC address assigned to the VRRP group. The transmission-source IP address is a physical IP address assigned to the transmission port of the transmission-source VM. The data includes priority level and a virtual IP address assigned to the VRRP group.

Figure 10:
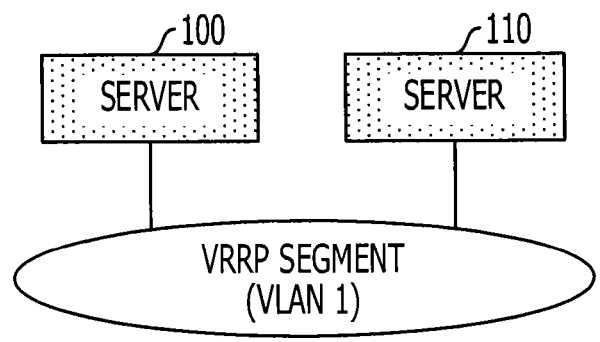
FIG. 10 illustrates a VRRP segment.
Figure 11:
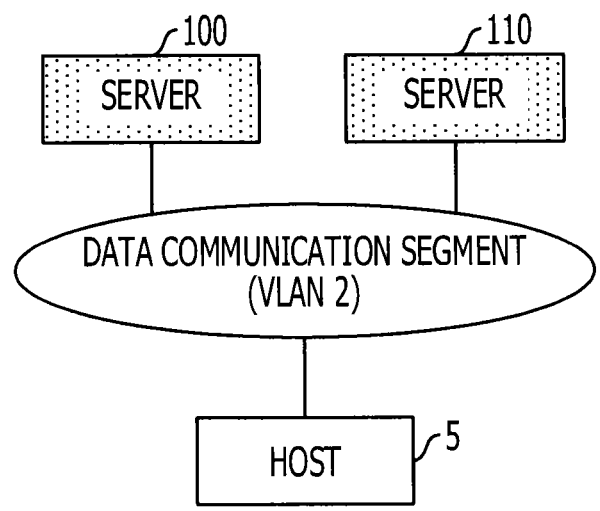
FIG. 11 is a diagram illustrating a data communication segment.

FIGS. 10 and 11 illustrate logical networks of the system according to this embodiment. FIG. 10 illustrates a VRRP segment (in this embodiment, referred to as a VLAN 1) in the system. The server 100 and the server 110 belong to the VRRP segment. The VRRP segment is a network through which a VRRP Advertisement message passes.

In contrast, as illustrated in FIG. 11, the server 100, the server 110, and the host 5 belong to a data communication segment. The data communication segment is referred to as a VLAN 2. The data communication segment is a network through which communication data between a host and a server passes.

As described above, the VRRP segment and the data communication segment are established separately in order to avoid the VRRP Advertisement message reaching the host.

Figure 12:
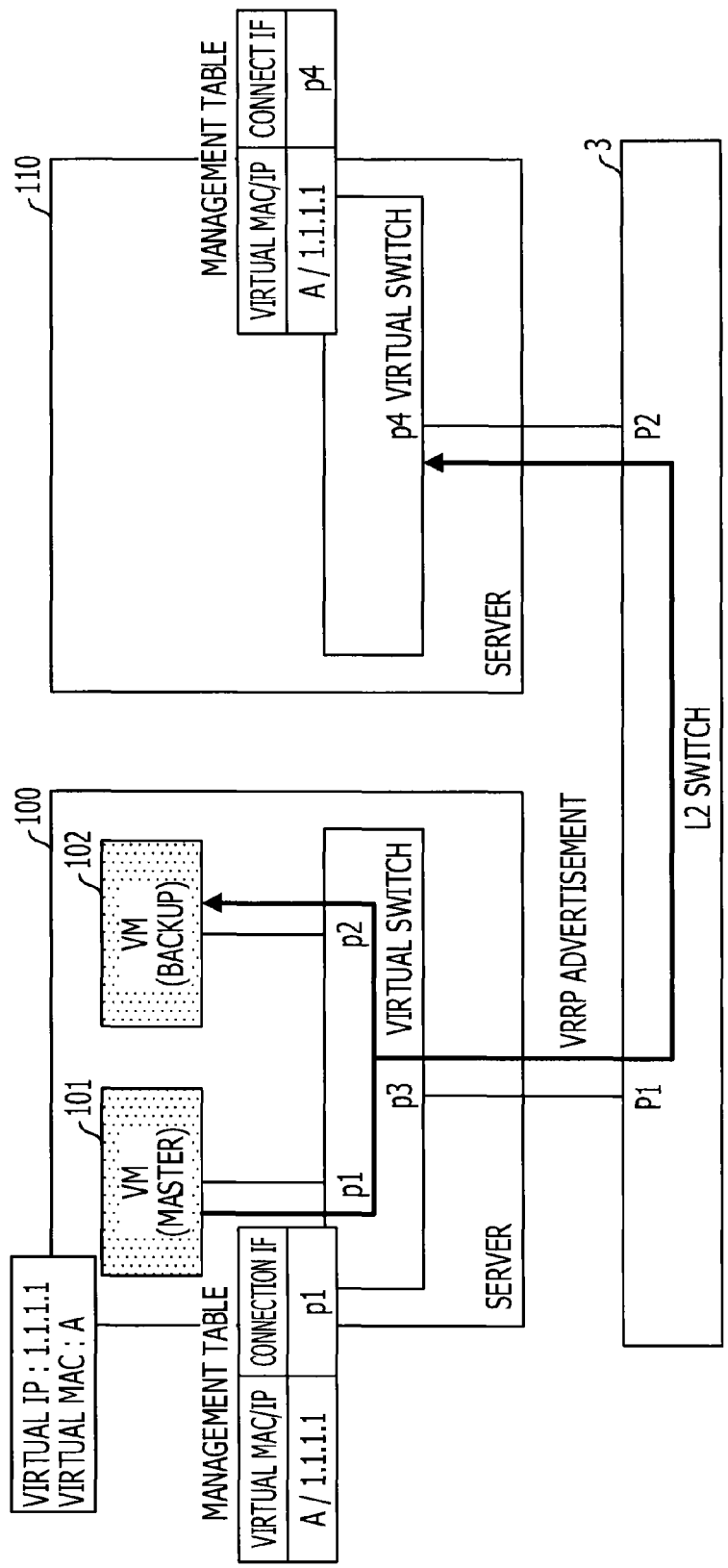
FIG. 12 is a diagram for explaining a method for detecting movement of a master node.

A method for detecting movement of a master node will now be explained, with reference to FIGS. 12 and 13. FIG. 12 illustrates an example of a state before movement occurs. The VM 101 serving as a master node exists within the server 100 and is connected to a port "p1" of the virtual switch. When the master node performs multicast transmission of a VRRP Advertisement message, the VRRP Advertisement message reaches the VM 102 serving as a backup node. At the same time, the VRRP Advertisement message passes through the virtual switch within the server 100 and reaches the virtual switch within the server 110. Here, the virtual switch within the server 100 registers the identifier "p1" of a reception port of the VRRP Advertisement message into the management table storage unit 1005. In addition, the virtual switch within the server 100 snoops on the VRRP Advertisement message, and registers the virtual MAC address and the virtual IP address into the management table storage unit 1005. The virtual switch within the server 110 also performs registration to the management table storage unit 1005. In the case of the example illustrated in FIG. 12, the identifier of the reception port of the VRRP Advertisement message is "p4".

Figure 13:
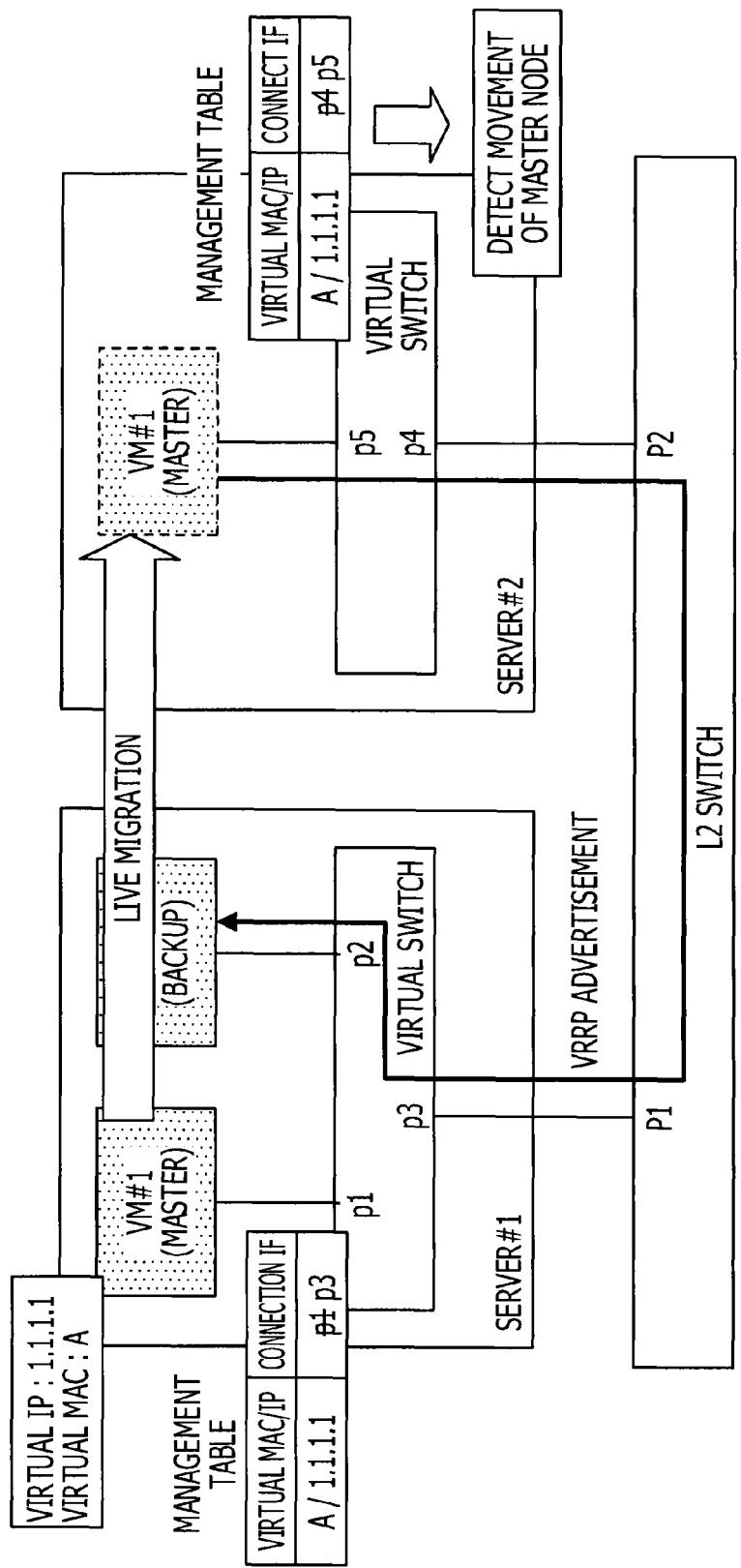
FIG. 13 is a diagram for explaining a method for detecting movement of a master node.

FIG. 13 illustrates the state after movement occurs. The master node within the server 100 is moved to the server 110 by live migration. After the movement is completed, the master node transmits a VRRP Advertisement message. The VRRP Advertisement message passes through the virtual switch within the server 110, and reaches the virtual switch within the server 100. The VRRP Advertisement message is transferred to the backup node. Since the reception port of the VRRP Advertisement message received at each virtual switch differs between before and after movement, data stored in the management table storage unit 1005 is updated. The virtual switch within the server 100 registers "p3", and the virtual switch within the server 110 registers "p5". Furthermore, by confirming whether the port after the updating is not on the L2 switch side but on the VM side, it is determined whether the master node has moved to the same physical server or not. In the server 100, since the port "p3" is not connected to a VM, it is detected that the master node has moved to a different server. Meanwhile, in the server 110, since the port "p5" is connected to a VM, it is detected that the master node has moved to the same server.

Figure 14:
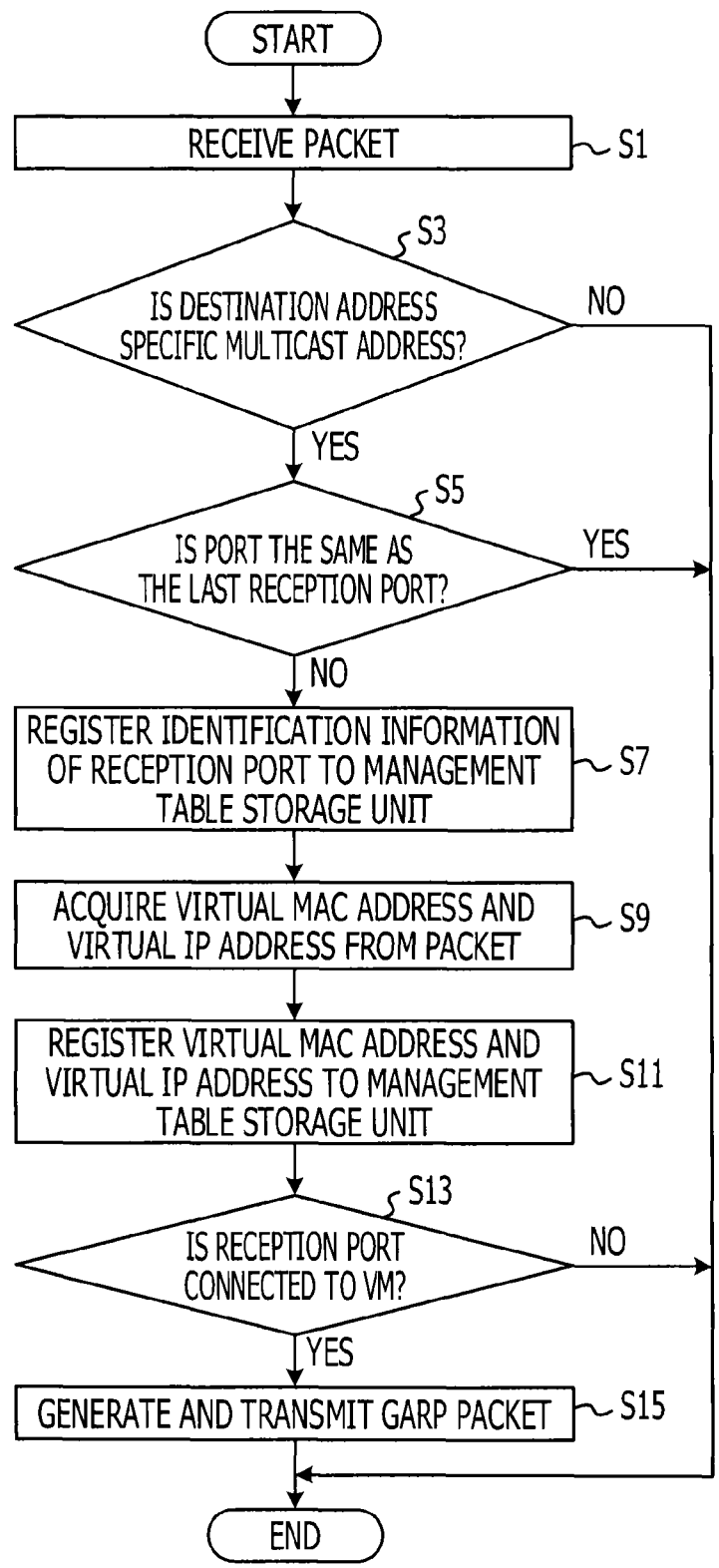
FIG. 14 is a diagram illustrating a main processing flow.

Next, a process of the system according to this embodiment will be explained in detail. First, the I/O interface 1001 in a virtual switch receives a packet (step S1 in FIG. 14). The I/O interface 1001 outputs the received packet to the bridging unit 1002. The bridging unit 1002 outputs the packet received from the I/O interface 1001 to the monitoring unit 1003.

The monitoring unit 1003 determines whether a destination address is a specific multicast address (step S3). The specific multicast address is a dedicated multicast address set as the destination address of a VRRP Advertisement message. As described above, the IP address is "224.0.0.18", and the MAC address is "01:00:5e:00:00:12".

In the case where the destination address is not the specific multicast address (NO route in step S3), since the received packet is not a VRRP Advertisement message, the process is terminated. In contrast, in the case where the destination address is the specific multicast address (YES route in step S3), the monitoring unit 1003 determines whether the reception port of the packet is the same as the last reception port (step S5). The identifier of the last reception port is stored in the management table storage unit 1005.

In the case where the reception port of the packet is the same as the last reception port (YES route in step S5), since the VM has not moved, the process is terminated. In contrast, in the case where the reception port of the packet is not the same as the last reception port (NO route in step S5), the monitoring unit 1003 stores the identifier of the reception port into the management table storage unit 1005 (step S7). That is, in step S7, the identifier that has been stored in the management table storage unit 1005 is updated to the identifier of the current reception port. The monitoring unit 1003 outputs the packet to the snooping unit 1004.

The snooping unit 1004 acquires a virtual MAC address and a virtual IP address from the packet (step S9). Then, the snooping unit 1004 stores the acquired virtual MAC address and virtual IP address into the management table storage unit 1005 (step S11). In step S11, the virtual MAC address and the virtual IP address are stored in association with the identifier of the reception port stored in step S7.

The monitoring unit 1003 determines whether the current reception port is a port to which the VM is connected (step S13). Since a virtual switch stores information which manages the connection destination of each port, the monitoring unit 1003 performs the processing of step S13 using the information.

In the case where the reception port is not a port to which the VM is connected (NO route in step S13), the VM has not moved to the same server as that in which the virtual switch is being performed. Therefore, the process is terminated. In contrast, in the case where the reception port is a port to which the VM is connected (YES route in step S13), the monitoring unit 1003 issues to the GARP management unit 1006 a request to execute processing. The GARP management unit 1006 generates a GARP packet containing the virtual MAC address and the virtual IP address acquired from the packet, and transmits the generated GARP packet to the layer 2 switch 3. More specifically, the GARP management unit 1006 outputs the generated GARP packet to the bridging unit 1002, and the bridging unit 1002 outputs the received GARP packet to the I/O interface 1001. The I/O interface 1001 transmits to the layer 2 switch 3 the GARP packet received from the bridging unit 1002 (step S15). Then, the process is terminated.

The processing unit 31 in the layer 2 switch 3 changes the identifier of a port stored in association with the virtual MAC address included in the GARP packet in the FDB 32, into the identifier of the port that has received the current GARP packet.

By performing the process described above, the FDB 32 in the layer 2 switch 3 is updated at the timing when the VM serving as a master node transmits the VRRP Advertisement message after movement. Accordingly, data whose destination is the VRRP group is suppressed from being transmitted to the original server, thus suppressing the occurrence of a communication failure.

Figure 15:
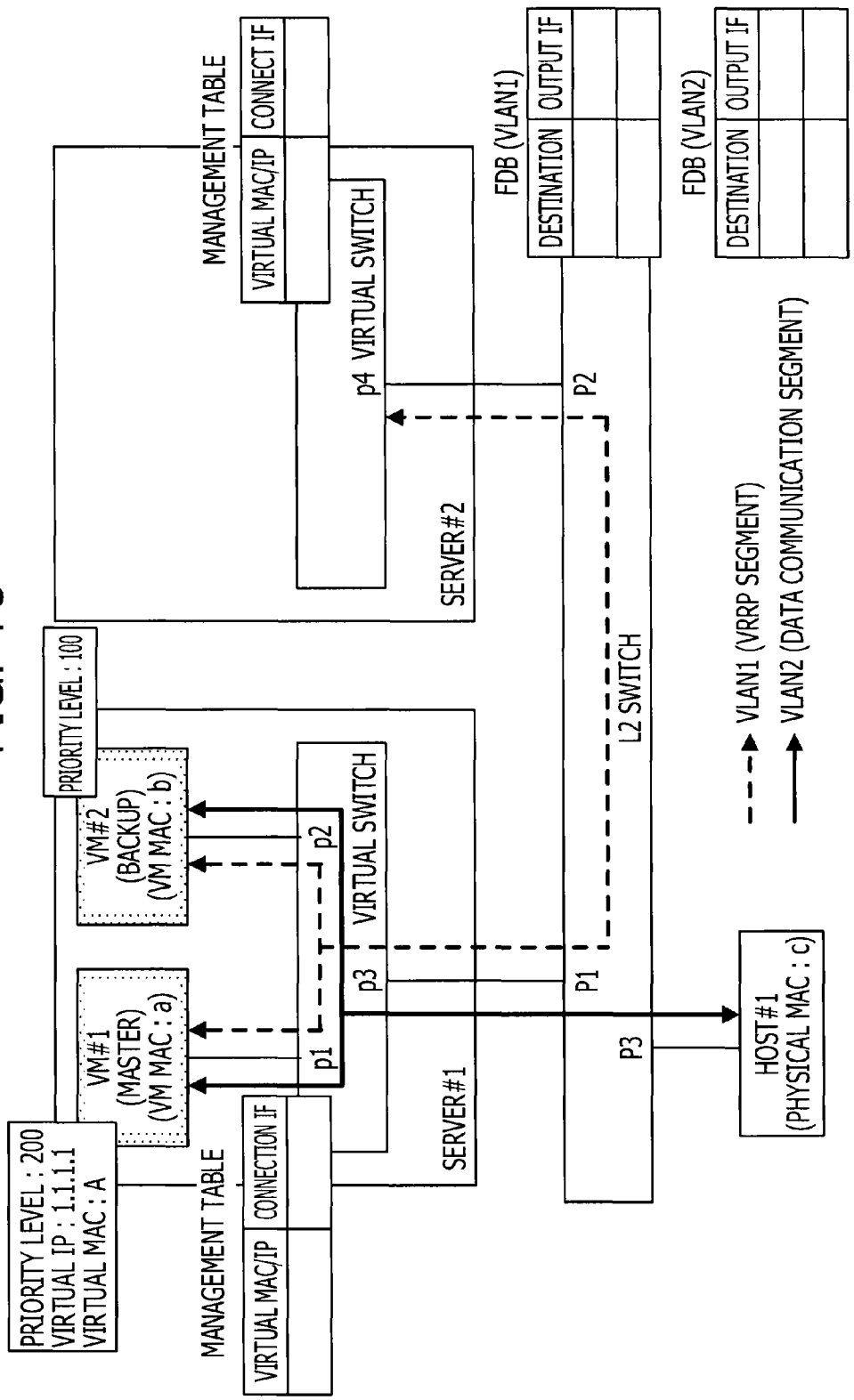
FIG. 15 is a diagram illustrating a specific example of an operation of the system.

Next, an operation of the system according to this embodiment will be specifically explained with reference to FIGS. 15 to 23. FIG. 15 illustrates a network topology. Referring to FIG. 15, the host #1, the server #1, and the server #2 are connected to the L2 switch. The server #1 and the server #2 are used as a virtualization environment. In the server #1, the VM #1 and the VM #2 are performed. The MAC address assigned to a virtual network interface card (NIC) of the VM #1 is set to "a", and the MAC address assigned to a virtual NIC of the VM #2 is set to "b". The MAC address of a physical NIC of the host #1 is set to "c".

A VRRP is set between the VM #1 and the VM #2, and the VM #1 is defined as a master node. The virtual IP address used for the VRRP is set to "1.1.1.1", and the virtual MAC address used for the VRRP is set to "A". The segment through which a VRRP Advertisement message passes is defined as a VLAN 1, and the segment through which communication data among the host #1, the VM #1, and the VM #2 passes is defined as a VLAN 2. At this stage, no data is stored in either the management table storage unit 1005 in the virtual switch or the FDB 32 in the L2 switch.

Figure 16:
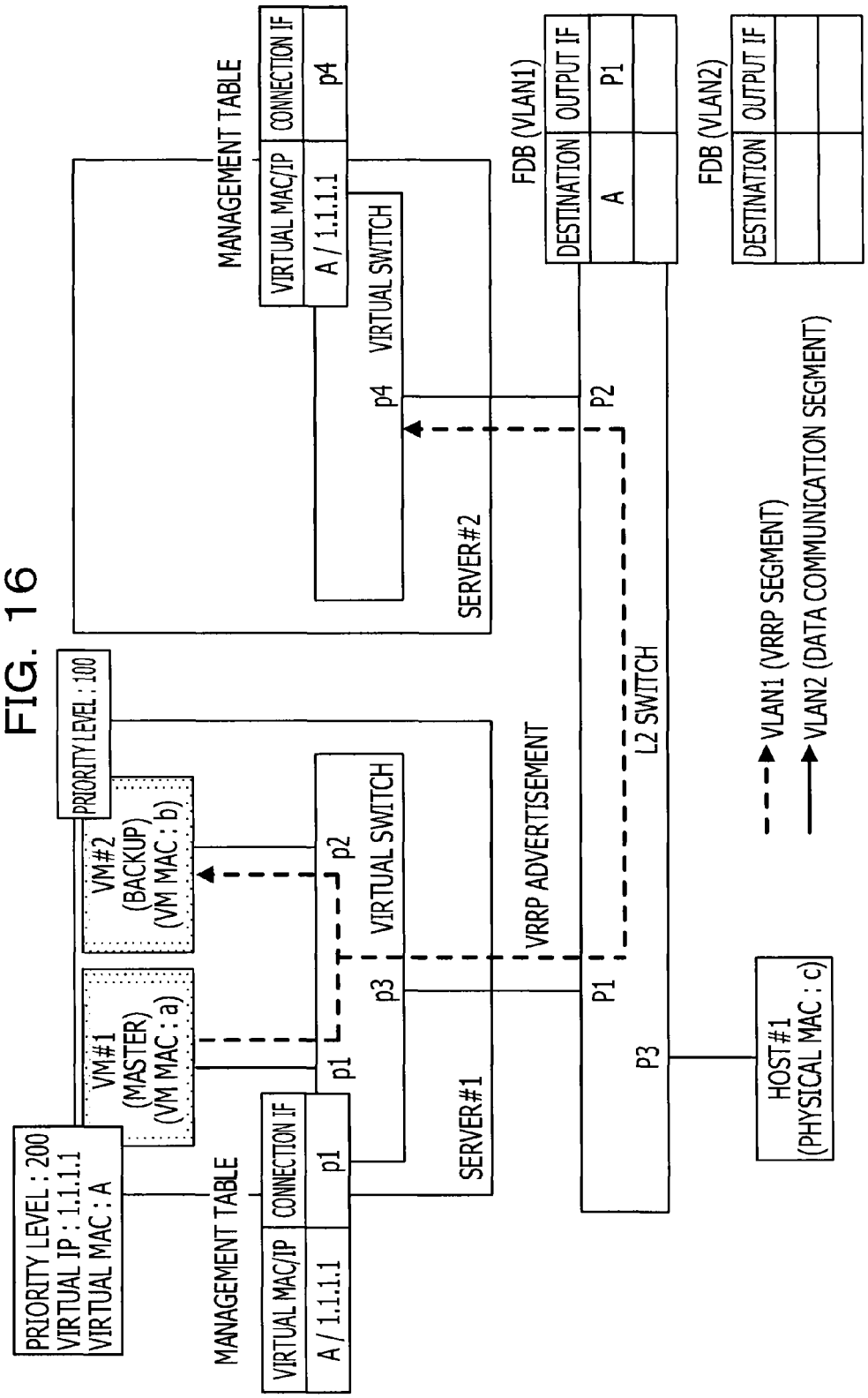
FIG. 16 is a diagram illustrating a specific example of an operation of the system.

FIG. 16 illustrates an operation for generating an entry in the management table storage unit 1005. When the VRRP is set, the master node regularly performs multicast transmission of VRRP Advertisement messages. The virtual switch of the server #1 which has received a VRRP Advertisement message generates, in the case where a reception port which has received the VRRP Advertisement message is different from the last reception port, an entry in the management table storage unit 1005. More specifically, the virtual switch of the server #1 registers the identifier "p1" of the reception port for the VRRP Advertisement message as the connection IF in the management table storage unit 1005. Furthermore, snooping on the VRRP Advertisement message is performed, and "A" and "1.1.1.1" are registered as the virtual MAC address and the virtual IP address, respectively, into the management table storage unit 1005. In contrast, the virtual switch of the server #2 registers the identifier "p4" of the reception port for the VRRP Advertisement message as the connection IF in the management table storage unit 1005. Furthermore, snooping on the VRRP Advertisement message is performed, and "A" and "1.1.1.1" are registered as the virtual MAC address and the virtual IP address, respectively, into the management table storage unit 1005.

When receiving a VRRP Advertisement message, the L2 switch registers the transmission-source MAC address "A" and the identifier "P1" of the reception port in association with each other into the FDB 32. Since the VRRP Advertisement message passes through the segment of the VLAN 1, data for the VLAN 1 in the FDB 32 is updated.

Figure 17:
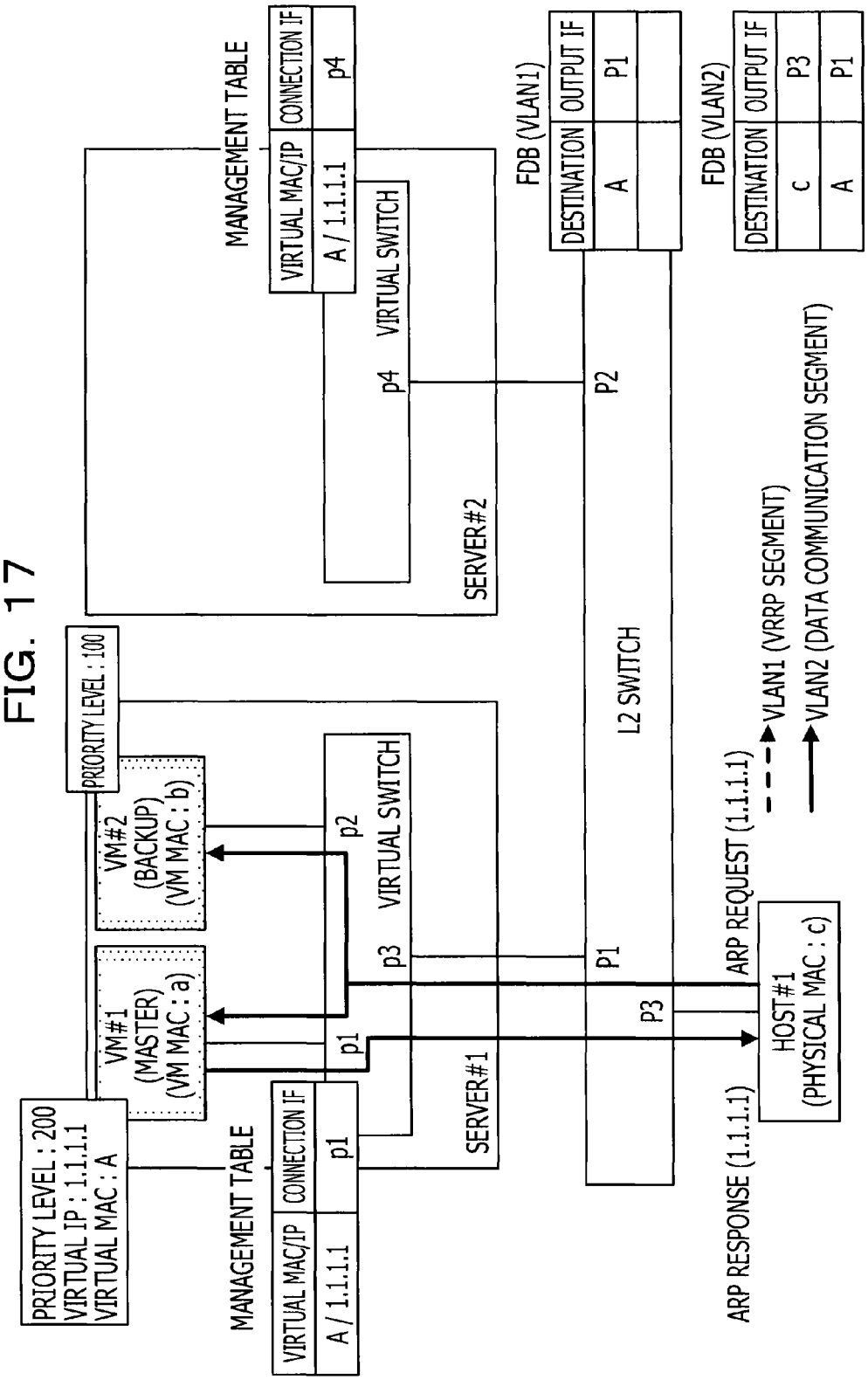
FIG. 17 is a diagram illustrating a specific example of an operation of the system.

FIG. 17 illustrates an operation performed when the host #1 transmits an ARP request. In order to examine a MAC address corresponding to the virtual IP address "1.1.1.1" of the VRRP group, the host #1 performs broadcast transmission of an ARP request. When receiving the ARP request, the L2 switch transfers the ARP request to the server #1. The virtual switch in the server #1 transmits the ARP request to the VM #1 and the VM #2. The VM #1, which is the master node that receives the ARP request, transmits an ARP response.

The L2 switch registers, for the ARP request, the transmission-source MAC address "c" and the identifier "P3" of the reception port in association with each other into the FDB 32. The L2 switch registers, for the ARP response, the transmission-source MAC address "A" and the identifier "P1" of the reception port in association with each other into the FDB 32. Since the ARP request and the ARP response pass through the segment of the VLAN 2, data for the VLAN 2 in the FDB 32 is updated.

Figure 18:
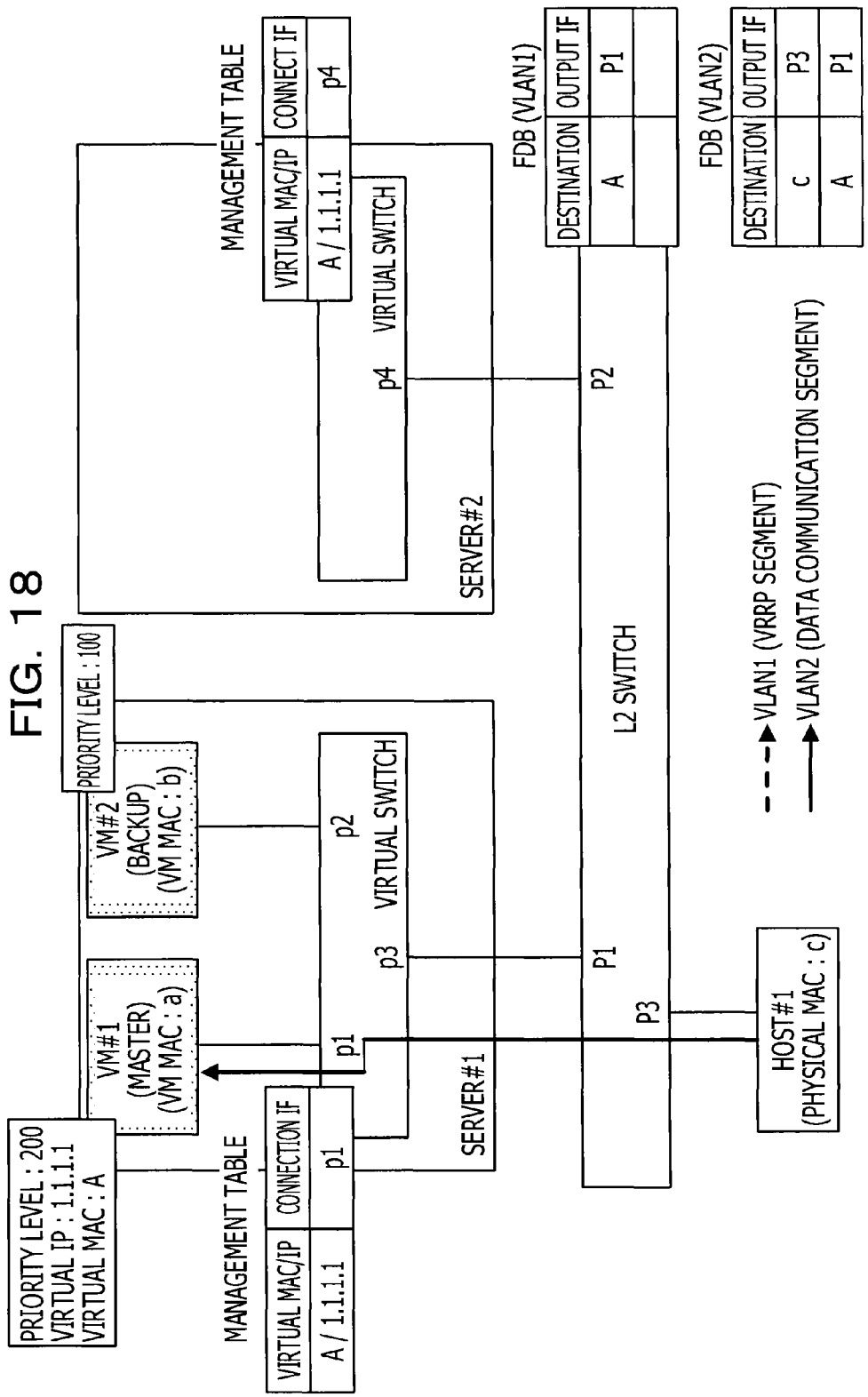
FIG. 18 is a diagram illustrating a specific example of an operation of the system.

When the processing for the ARP is completed, unicast communication is performed between the host #1 and the VM #1 serving as the master node, as illustrated in FIG. 18. That is, the host #1 transmits unicast data indicating the destination MAC address "A" and the destination IP address "1.1.1.1". When receiving the unicast data, the L2 switch outputs the unicast data via the port "P1" in accordance with the entry in the FDB 32. When receiving the unicast data, the server #1 outputs the unicast data via the port "p1" in accordance with the data stored in the management table storage unit 1005. Then, the VM #1 receives the unicast data. Similar relay is performed when the VM #1 transmits the unicast data to the host #1.

Figure 19:
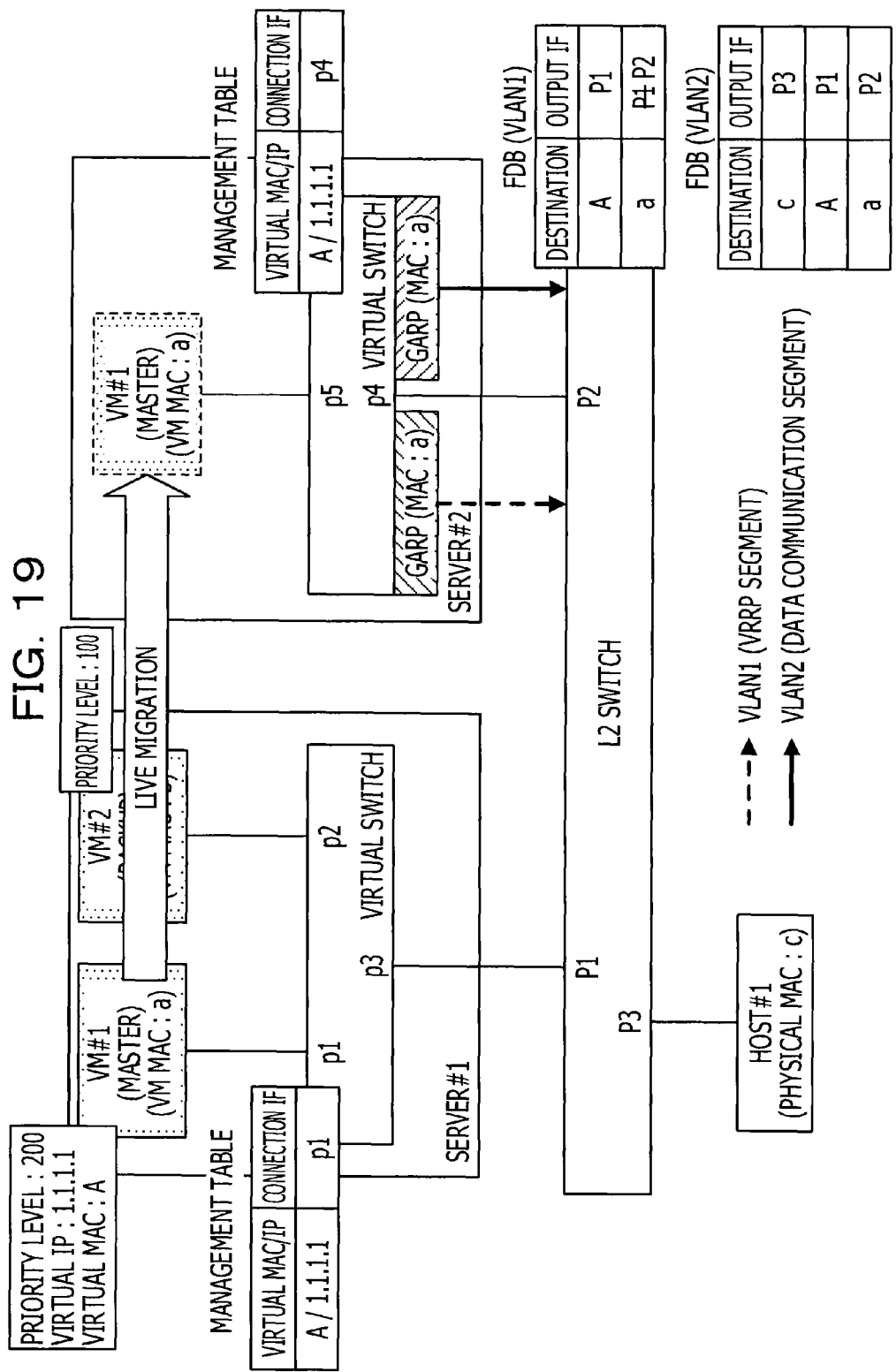
FIG. 19 is a diagram illustrating a specific example of an operation of the system.

FIG. 19 illustrates an operation performed in the case where the master node is moved to the server #2 by live migration. When the master node moves to the server #2, the virtual switch of the server #2 transmits a GARP packet containing the MAC address "a" of the virtual NIC of the VM #1 to the VLAN 1 and the VLAN 2. When receiving the GARP packet, the L2 switch updates an entry containing "a" in data for each of the VLAN 1 and the VLAN 2 in the FDB 32. More specifically, for the VLAN 1, the output IF is changed from "P1" into "P2", and for the VLAN 2, a new entry is added.

Figure 20:
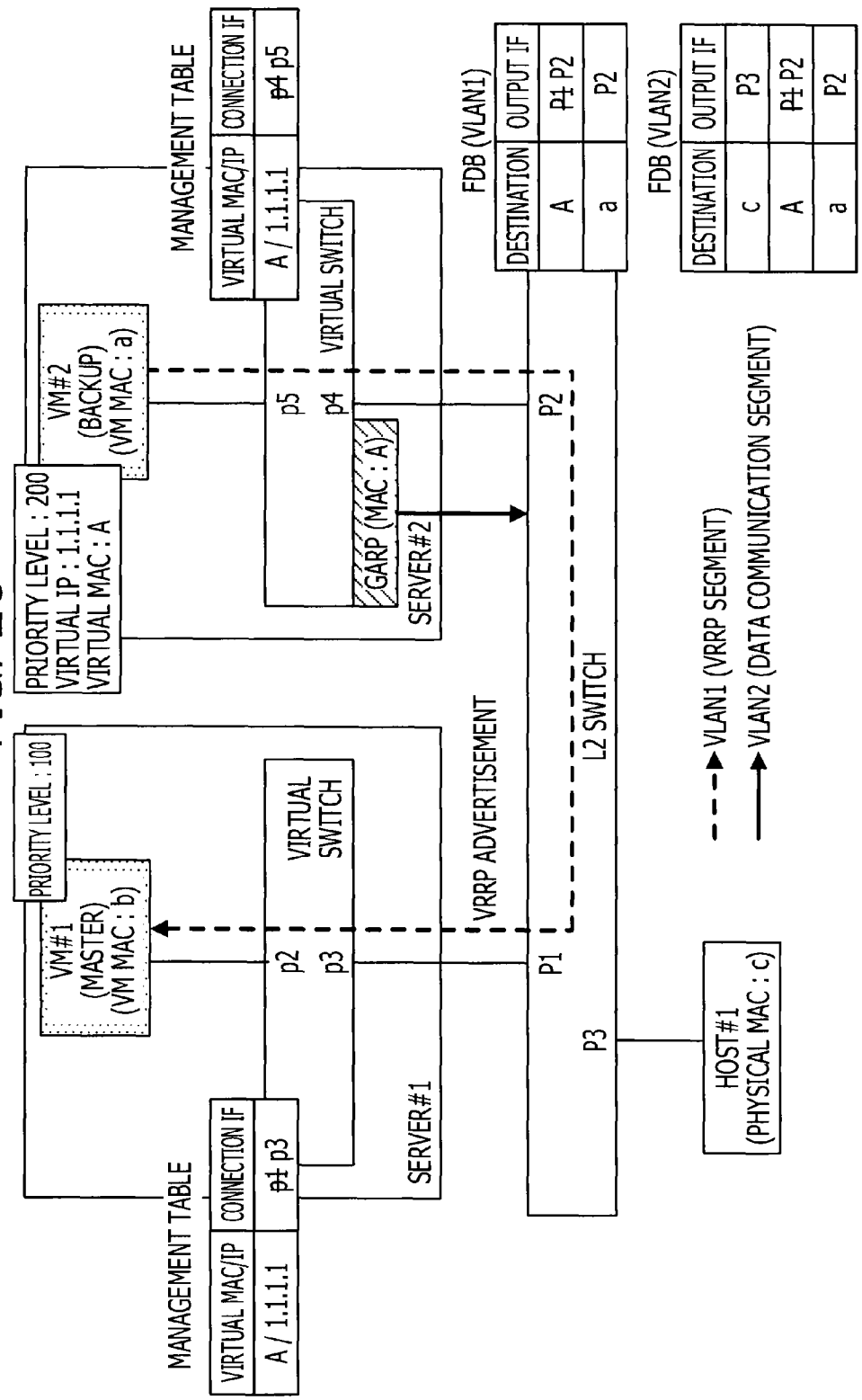
FIG. 20 is a diagram illustrating a specific example of an operation of the system.

FIG. 20 illustrates transfer of a VRRP Advertisement message after a master node is moved. After live migration is completed, a VRRP Advertisement message is transmitted from the master node in the server #2, passes through the virtual switch in the server #2, and reaches the virtual switch in the server #1. The VRRP Advertisement message that has reached the virtual switch of the server #1 is transmitted to a backup node.

The connection IF in the management table storage unit 1005 of the server #2 is changed from "p4" into "p5", and the connection IF in the management table storage unit 1005 of the server #1 is changed from "p1" into "p3". After receiving the VRRP Advertisement message, the L2 switch updates an entry containing "A" in the data for the VLAN 1 in the FDB 32. More specifically, the output IF is changed from "P1" into "P2".

Although the connection IF in the management table storage unit 1005 of the server #2 is changed into "p5", since the connection destination of "p5" is a VM, the virtual switch transmits a GARP packet containing the virtual MAC address "A" to the L2 switch. This GARP packet is transmitted only to the VLAN 2. When receiving the GARP packet, the L2 switch updates an entry containing "A" in the data for the VLAN 2 in the FDB 32. More specifically, the output IF is changed from "P1" into "P2".

Figure 21:
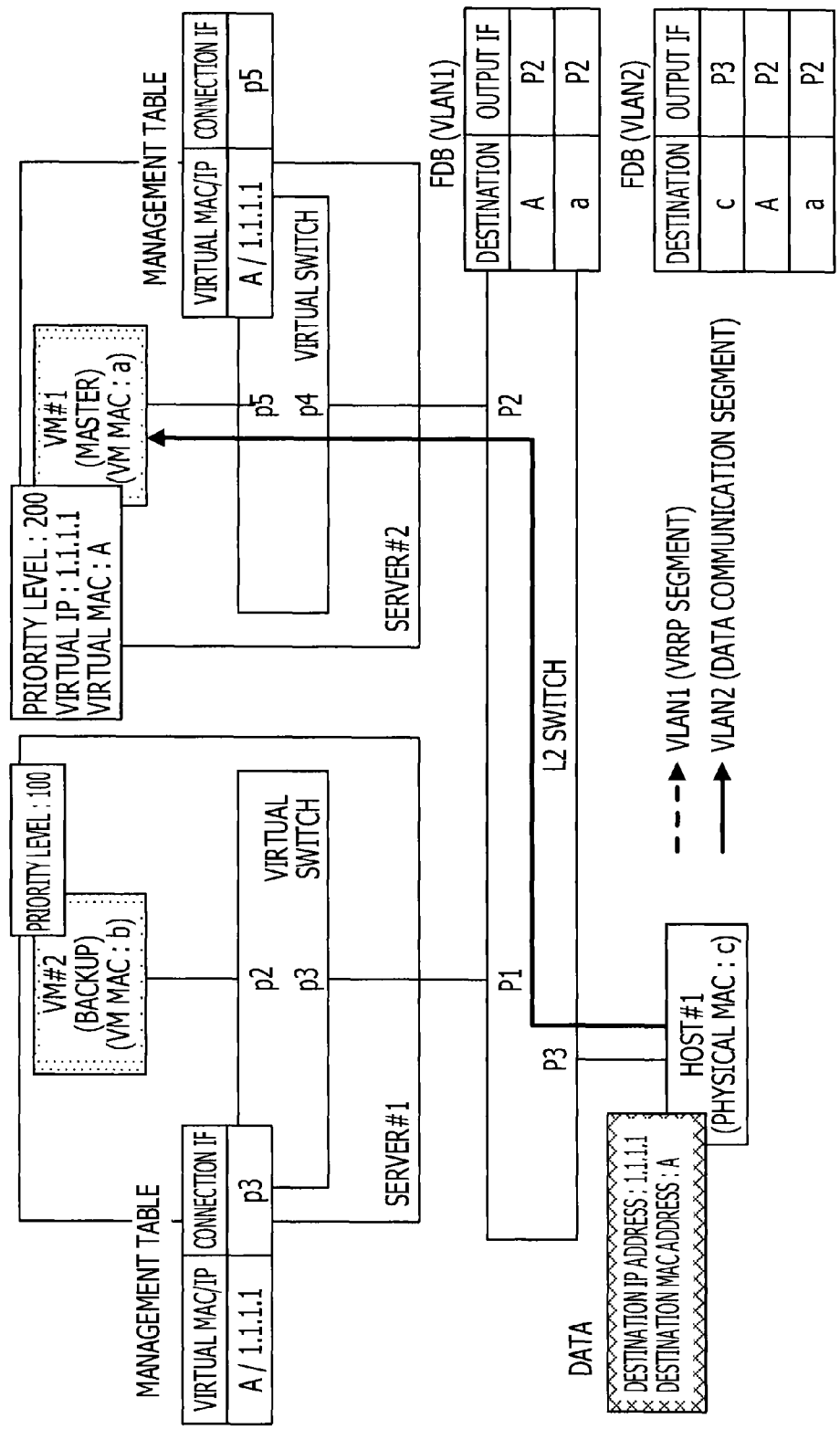
FIG. 21 is a diagram illustrating a specific example of an operation of the system.

FIG. 21 illustrates data communication after live migration is performed. The host #1 transmits unicast data indicating the destination MAC address "A" and the destination IP address "1.1.1.1". When receiving the unicast data, the L2 switch outputs the unicast data via the port "P2" in accordance with the entry in the FDB 32. When receiving the unicast data, the virtual switch in the server #2 outputs the unicast data via the port "p5" in accordance with the data stored in the management table storage unit 1005. Then, the VM #1 receives the unicast data. Similar relay is performed when the VM #1 transmits the unicast data to the host #1.

Figure 22:
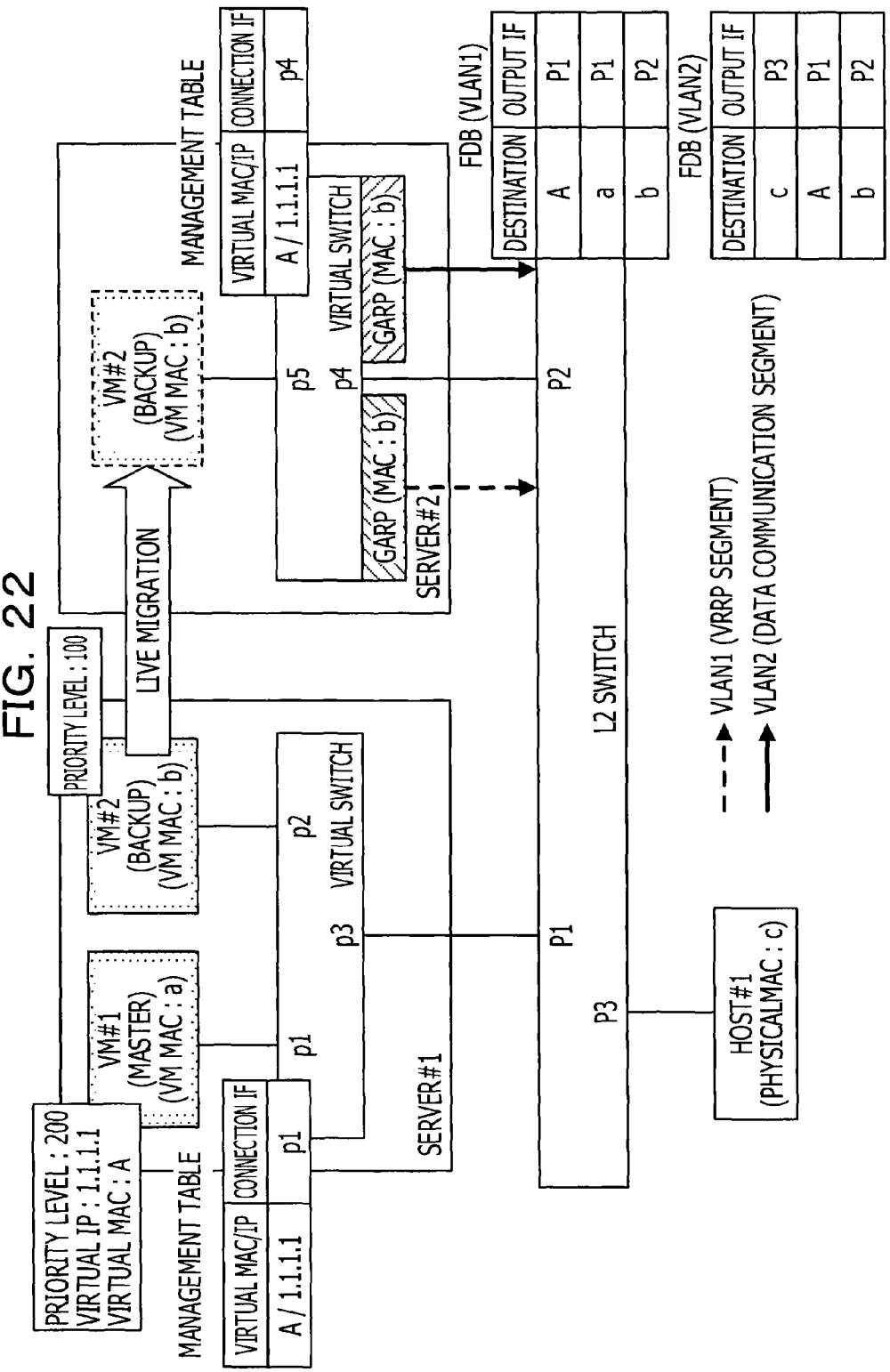
FIG. 22 is a diagram illustrating a specific example of an operation of the system.

FIG. 22 illustrates an operation performed in the case where the backup node is moved to the server #2 by live migration in the state illustrated in FIG. 18. When the backup node moves to the server #2, the virtual switch transmits a GARP packet containing the MAC address "b" of the virtual NIC of the VM #2 to the VLAN 1 and the VLAN 2. When receiving the GARP packet, the L2 switch updates an entry containing "b" in the data for the VLAN 1 and the data for the VLAN 2 in the FDB 32. More specifically, new entries are added for the VLAN 1 and the VLAN 2.

Figure 23:
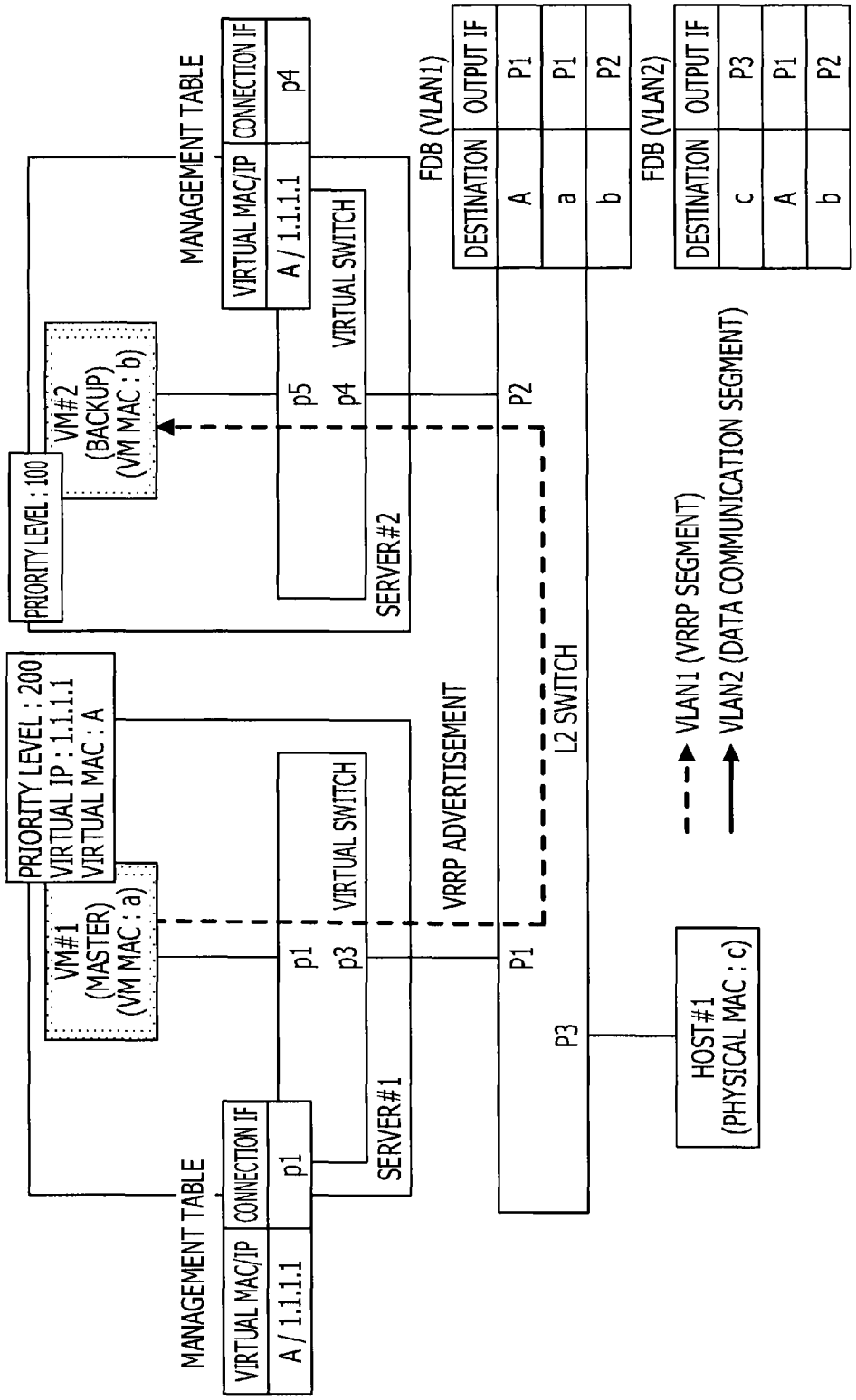
FIG. 23 is a diagram illustrating a specific example of an operation of the system.

FIG. 23 illustrates transfer of a VRRP Advertisement message performed after the backup node is moved. After live migration is completed, a VRRP Advertisement message is transmitted from the master node in the server #1, passes through the virtual switch in the server #1, and reaches the virtual switch in the server #2. The VRRP Advertisement message that has reached the virtual switch in the server #2 is transferred to the backup node. However, since the master node has not moved, data in the management table storage unit 1005 in each virtual switch is not updated.

By performing the processing as described above, even if the location of the master node is changed by live migration, the FDB 32 can be updated quickly, thus suppressing the occurrence of a communication failure.

An embodiment has been described above. However, the embodiment is not limited to this. For example, the functional block configuration of the layer 2 switch 3 and the servers 100 and 110 described above is not necessarily the same as the actual program module configuration.

Furthermore, the configuration of each of the tables described above is merely an example and each of the tables is not necessarily configured as described above. Furthermore, regarding a processing flow, the order of processing operations may be changed as long as the same processing result is obtained. Moreover, processing operations may be performed concurrently.

For example, although the example in which a GARP packet is transmitted in step S15 has been explained, a GARP packet is not necessarily transmitted in step S15. A packet containing the virtual MAC address of the VRRP group may be transmitted, and the layer 2 switch 3 may update the FDB 32, in accordance with the reception of the packet.

Figure 24:
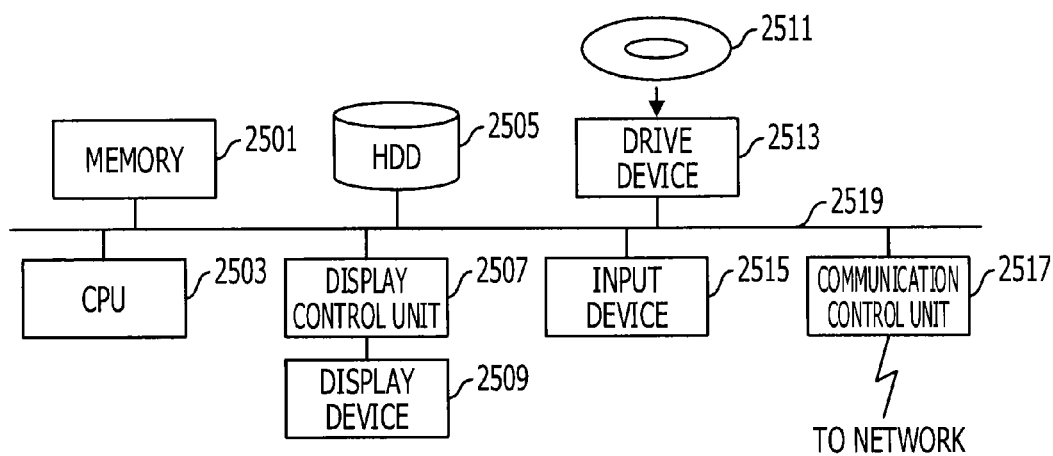
FIG. 24 is a functional block diagram of a computer.

Each of the servers 100 and 110 described above is a computer apparatus. As described in FIG. 24, a memory 2501, a central processing unit (CPU) 2503, a hard disk drive (HDD) 2505, a display control unit 2507 connected to a display device 2509, a drive device 2513 for a removable disk 2511, an input device 2515, and a communication control unit 2517 for allowing connection to a network are connected via a bus 2519 in each of the servers 100 and 110. An operating system (OS) and an application program for executing processes in an embodiment are stored in the HDD 2505. The programs are read from the HDD 2505 to the memory 2501 and are executed by the CPU 2503. The CPU 2503 controls the display control unit 2507, the communication control unit 2517, and the drive device 2513, in accordance with the processing details of the application program, to perform specific operations. Furthermore, although data being processed is mainly stored in the memory 2501, they may be stored in the HDD 2505. In the embodiments, an application program for executing the processes described above is stored in the removable disk 2511, which is readable by a computer, and is distributed. The distributed application program is installed via the drive device 2513 into the HDD 2505. The application program may be installed via a network, such as the Internet, and the communication control unit 2517 into the HDD 2505. Such a computer apparatus implements the various functions described above by organic cooperation between hardware, such as the CPU 2503, the memory 2501, and the like, and a program, such as an application program, described above.

The foregoing embodiments are summarized as follows:

An information processing system according to an embodiment includes (A) a relay apparatus; and (B) a first information processing apparatus and a second information processing apparatus that are connected to the relay apparatus. The above-mentioned second information processing apparatus includes (b1) a first processing unit that detects that a current-in-use virtual machine of a plurality of virtual machines implementing a redundant configuration has moved from the first information processing apparatus to the second information processing apparatus; and (b2) a second processing unit that transmits, in a case where the first processing unit detects that the current-in-use virtual machine has moved to the second information processing apparatus, an address of a group to which the plurality of virtual machines belong, to the relay apparatus. The above-mentioned relay apparatus includes (a1) a data storage unit that stores an address and identification information of a port in association with each other; and (a2) a third processing unit that changes the identification information of the port that is stored in association with the received address of the group in the data storage unit from the identification information of a port connected to the first information processing apparatus into the identification information of a port connected to the second information processing apparatus.

With this configuration, the relay apparatus may be quickly set in such a manner that in the case where the current-in-use virtual machine has moved, data whose destination is the group will be relayed by the current-in-use virtual machine that has moved, thus suppressing the occurrence of a communication failure.

Furthermore, the first processing unit may (b11) detect that the current-in-use virtual machine has moved by detecting that a transfer source of a specific message transmitted from the current-in-use virtual machine has been changed from the relay apparatus into a virtual machine within the second information processing apparatus. With this arrangement, in the case where the above-mentioned group is a group (for example, a VRRP group) characterizing in the current-in-use virtual machine transmitting the specific message, movement of the current-in-use virtual machine may be efficiently detected.

Furthermore, the above-mentioned second processing unit may (b21) transmit to the relay apparatus a packet of an address resolution protocol, containing the address of the group to which the plurality of virtual machines belong. In the above-mentioned information processing system, the address resolution protocol is a protocol that is normally used. Therefore, with the use of such an address resolution protocol, a modification to the information processing system may be reduced.

Furthermore, the above-mentioned address of the group may include a virtual MAC address of the group. With this arrangement, even in the case where the relay apparatus is, for example, a layer 2 switch, setting may be performed in an appropriate manner.

Furthermore, the above-mentioned specific message may be an Advertisement message in a VRRP. Advertisement messages in the VRRP are regularly transmitted. Therefore, with the use of such an Advertisement message, settings may be reliably changed in the case where the group is a VRRP group.

A program for causing a computer to perform a process based on the above-mentioned method may be created. Such a program is stored in a computer-readable storage medium, such as a flexible disk, a compact disk read-only memory (CD-ROM), a magneto-optical disk, a semiconductor memory, or a hard disk, or a storage device. An intermediate processing result is temporarily stored in a storage device, such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system, comprising:
   a first server configured to execute a first virtual machine and a second virtual machine among a plurality of virtual machines belonging to both a first virtual network and a second virtual network, each of the plurality of virtual machines are identified by a common address in the second virtual network and the second virtual machine is configured to be a back-up virtual machine for the first virtual machine;
   a second server; and
   a switch including a first port coupled to the first server, a second port coupled to the second server and a third port coupled to a computer apparatus, the computer apparatus being configured to belong to the second virtual network and to communicate with the plurality of virtual machines based on the common address, the switch being configured to:
   store an association between the common address and the first port; and
   update the association to associate the common address with the second port in place of the first port when the first virtual machine is migrated from the first server to the second server, wherein
   the first virtual network is a virtual network coupling the plurality of virtual machines,
   the first virtual machine is configured to broadcast a message within the first virtual network to notify the common address,
   the second virtual network is a network coupling the first virtual machine and the second virtual machine in accordance with a virtual router redundancy protocol (VRRP), and
   the first virtual network is a network to transfer a VRRP advertisement message.

2. The system of claim 1, wherein the first virtual machine is configured to broadcast the message via the first virtual network when the first virtual machine is migrated from the first server to the second server.

3. The system of claim 1, wherein the association is included in forwarding information to be referred when the switch forwards data, the forwarding information further including another association between a distinct address identifying the first virtual machine and the second port after the first virtual machine is migrated from the first server to the second server.

4. The system of claim 1, wherein the first virtual machine is live migrated from the first server to the second server.

5. The system of claim 1, wherein the second server is configured to execute a virtual switch coupled to the migrated first virtual machine and the second port of the switch.

6. A method comprising:
   executing a first virtual machine and a second virtual machine among a plurality of virtual machines belonging to both a first virtual network and a second virtual network, each of the plurality of virtual machines are identified by a common address in the second virtual network and the second virtual machine is configured to be a back-up virtual machine for the first virtual machine;
   storing an association between the common address and a first port of a switch, the first port being coupled to a first server being configured to execute the first virtual machine and the second virtual machine; and
   updating the association to associate the common address with a second port of the switch coupled to a second server in place of the first port when the first virtual machine is migrated from the first server to the second server, wherein
   the switch includes a third port coupled to a computer apparatus, the computer apparatus being configured to belong to the second virtual network and to communicate with the plurality of virtual machines based on the common address,
   the first virtual network is a virtual network coupling the plurality of virtual machines,
   the first virtual machine is configured to broadcast a message within the first virtual network to notify the common address,
   the second virtual network is a network coupling the first virtual machine and the second virtual machine in accordance with a virtual router redundancy protocol (VRRP), and
   the first virtual network is a network to transfer a VRRP advertisement message.

7. A non-transitory computer-readable medium including a program, which when executed by a system, causes the system to perform a method, the method comprising:
   executing a first virtual machine and a second virtual machine among a plurality of virtual machines belonging to both a first virtual network and a second virtual network, each of the plurality of virtual machines are identified by a common address in the second virtual network and the second virtual machine is configured to be a back-up virtual machine for the first virtual machine;
   storing an association between the common address and a first port of a switch, the first port being coupled to a first server being configured to execute the first virtual machine and the second virtual machine; and
   updating the association to associate the common address with a second port of the switch coupled to a second server in place of the first port when the first virtual machine is migrated from the first server to the second server, wherein
   the switch includes a third port coupled to a computer apparatus, the computer apparatus being configured to belong to the second virtual network and to communicate with the plurality of virtual machines based on the common address,
   the first virtual network is a virtual network coupling the plurality of virtual machines,
   the first virtual machine is configured to broadcast a message within the first virtual network to notify the common address,
   the second virtual network is a network coupling the first virtual machine and the second virtual machine in accordance with a virtual router redundancy protocol (VRRP), and the first virtual network is a network to transfer a VRRP advertisement message.

* * * * *